United States Patent
Herbert

(10) Patent No.: US 10,480,686 B2
(45) Date of Patent: Nov. 19, 2019

(54) CORD MANAGEMENT KIT

(71) Applicant: Glenda Herbert, Quincy, CA (US)

(72) Inventor: Glenda Herbert, Quincy, CA (US)

(*) Notice: Subject to any disclaimer, the term of this patent is extended or adjusted under 35 U.S.C. 154(b) by 0 days.

(21) Appl. No.: 16/109,152

(22) Filed: Aug. 22, 2018

(65) Prior Publication Data
US 2019/0113156 A1   Apr. 18, 2019

Related U.S. Application Data

(60) Provisional application No. 62/571,999, filed on Oct. 13, 2017.

(51) Int. Cl.
| | |
|---|---|
| *F16G 11/02* | (2006.01) |
| *F16L 3/13* | (2006.01) |
| *H02G 3/32* | (2006.01) |
| *F16L 3/04* | (2006.01) |

(52) U.S. Cl.
CPC ............. *F16L 3/13* (2013.01); *F16G 11/02* (2013.01); *H02G 3/32* (2013.01); *F16L 3/04* (2013.01); *Y10T 24/33* (2015.01)

(58) Field of Classification Search
CPC .. H02G 3/32; H02G 3/305; H02G 3/30; F16L 3/13; F16L 3/04; Y10T 428/24008; Y10T 24/32; Y10T 24/33
USPC ........................................................ D8/356
See application file for complete search history.

(56) References Cited

U.S. PATENT DOCUMENTS

| | | | | |
|---|---|---|---|---|
| 4,910,362 A | * | 3/1990 | Kinner .................... | D06F 75/28 174/135 |
| 5,844,775 A | * | 12/1998 | Lundberg ................ | G06F 3/039 361/679.08 |
| 6,431,500 B1 | * | 8/2002 | Jacobs ..................... | F16L 3/13 24/129 R |
| 6,698,560 B2 | | 3/2004 | Reardon et al. | |
| 8,793,842 B2 | | 8/2014 | Donovan et al. | |
| 9,124,053 B2 | * | 9/2015 | Metras ................... | H01R 13/60 |
| 9,143,852 B2 | | 9/2015 | Demier | |
| 2007/0151750 A1 | | 7/2007 | Dean | |
| 2007/0155236 A1 | * | 7/2007 | Shi ........................... | F16L 3/13 248/68.1 |
| 2008/0121763 A1 | * | 5/2008 | Mori ........................ | H02G 3/32 248/68.1 |
| 2009/0127366 A1 | | 5/2009 | Costantino | |
| 2010/0200273 A1 | * | 8/2010 | Seil ......................... | H02G 3/32 174/135 |

(Continued)

*Primary Examiner* — Robert Sandy
*Assistant Examiner* — Michael S Lee
(74) *Attorney, Agent, or Firm* — Global Intellectual Property Agency, LLC; Daniel Boudwin

(57) ABSTRACT

A cord management kit to help manage cords. The cord management kit includes one or more base members removably affixed to a planar member designed to retain one or more base members. Each base member includes a lower side and an upper side, wherein the lower side of the base member includes a fastener, such as adhesive, designed to removably secure the base member to a surface. A clip is on the upper side of each base member, wherein the clip includes a pair of opposing arms composed of a padded material that form a gap, wherein the gap is designed to receive a cord therethrough. The arms are biased toward one another such that pressure is exerted against opposing sides of the cord received through the gap.

14 Claims, 2 Drawing Sheets

(56) References Cited

U.S. PATENT DOCUMENTS

| | | | | |
|---|---|---|---|---|
| 2010/0258685 A1* | 10/2010 | Gardner | .................... | F16L 3/13 |
| | | | | 248/68.1 |
| 2011/0030190 A1* | 2/2011 | Larson | ................. | G02B 6/4441 |
| | | | | 29/428 |
| 2014/0014787 A1* | 1/2014 | Chen | ........................ | H02G 3/32 |
| | | | | 248/74.1 |
| 2014/0090873 A1* | 4/2014 | Metras | ................... | H01R 13/60 |
| | | | | 174/135 |
| 2019/0074673 A1* | 3/2019 | Koch | ........................ | F16L 3/13 |

* cited by examiner

CORD MANAGEMENT KIT

CROSS REFERENCE TO RELATED APPLICATIONS

This application claims the benefit of U.S. Provisional Application No. 62/571,999 filed on Oct. 13, 2017. The above identified patent application is herein incorporated by reference in its entirety to provide continuity of disclosure.

BACKGROUND OF THE INVENTION

The present invention relates to cord management kits. More specifically, the present invention provides one or more base members removably affixed to a planar member, wherein the base member includes a lower side and an upper side. The lower side comprises a fastener configured to removably secure the base member to a surface, and the upper side includes a clip comprising a pair of opposing arms composed of a padded material, wherein the arms form a gap and are configured to receive a cord therethrough, and are additionally biased toward one another such that pressure is exerted against the sides of the cord received through the gap.

Portable electronic devices such as cells phones require a charging cord connected to a wall outlet or other power source in order to recharge the battery. Unfortunately, when an individual removes the the cell phone or other device from the charging cord, the cord will often fall off the table, desk, or surface upon which it was previously resting. In this way, the cord may become lost, or fall into an area that is difficult to reach, leading to frustration from the individual. Additionally, this can be especially dangerous when using a cord in an automobile. Further, if the individual is using the cord in an area with multiple different cords, it can be difficult to determine which cord is the correct cord to use without organizing every cord available. Thus, an improved cord management kit is desired to allow individuals to secure a cord or cable in a desired position.

SUMMARY OF THE INVENTION

In view of the foregoing disadvantages inherent in the known types of cord management kits now present in the known art, the present invention provides a cord management kit wherein the same can be utilized for providing convenience for the user when desiring a management kit for cords.

It is therefore an object of the present invention to provide a new and improved cord management kit that has all the advantages of the known art and none of the disadvantages. The present system comprises one or more base members removably affixed to a planar member configured to retain one or more base members. Each base member includes a lower side and an upper side, wherein the lower side of the base member comprises a fastener configured to removably secure the base member to a surface. A clip is disposed on the upper side of each base member, wherein the clip comprises a pair of opposing arms composed of a padded material that form a gap there between, wherein the gap is configured to receive a cord therethrough. The arms are biased toward one another such that pressure is exerted against opposing sides of the cord received through the gap.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
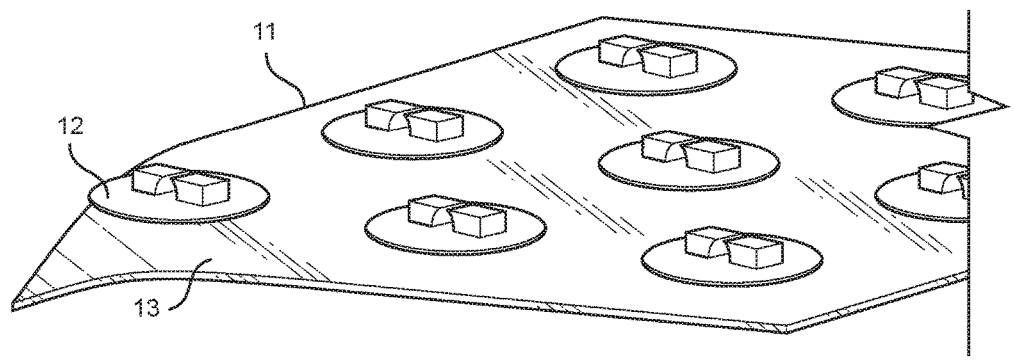
FIG. 1 shows a perspective view of an embodiment of the cord management kit.

Reference is made herein to the attached drawings. Like reference numerals are used throughout the drawings to depict like or similar elements of the cord management kit. The figures are intended for representative purposes only and should not be considered to be limiting in any respect.

Referring now to FIG. 1, there is shown a perspective view of an embodiment of the cord management kit. A cord management kit 11 comprises one or more base members 12 removably affixed to a planar member 13 configured to retain one or more base members 12. In the illustrated embodiment, the base members 12 are disposed on the planar member 13 in a grid arrangement at regular intervals, such that the base members 12 extend the full width and length of the planar member 13. In this way, it is convenient for the user to use or replace a base member 12 from the planar member 13. In additional embodiments, the base members 12 are annularly disposed across the planar member 13 or are disposed in staggered positions across the planar member 13.

Figure 2:
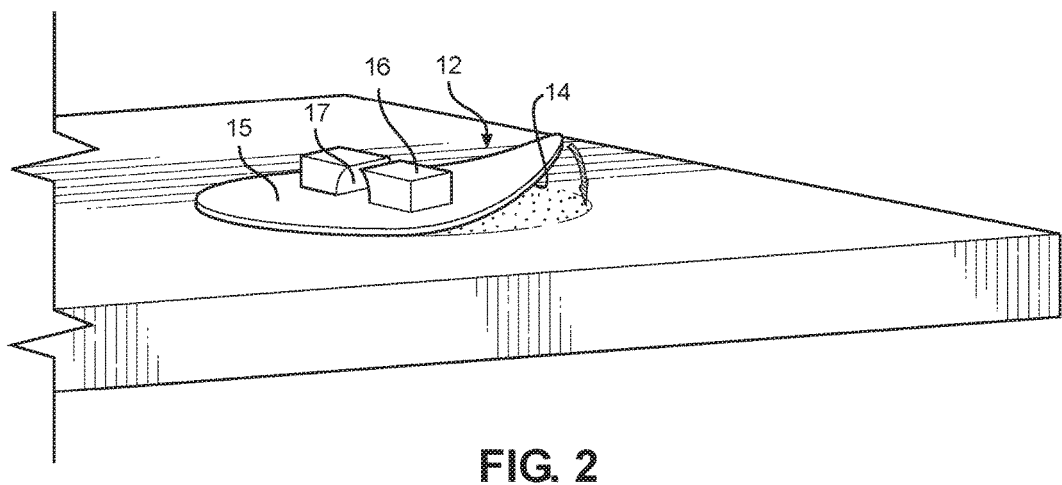
FIG. 2 shows a perspective view of an embodiment of the base member of the cord management kit.
Figure 3:
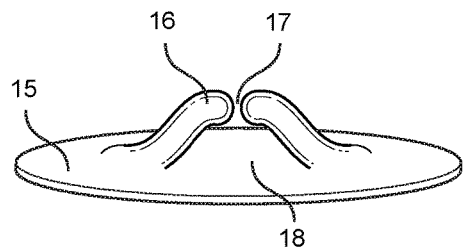
FIG. 3 shows another perspective view of an embodiment of the base member of the cord management kit.
Figure 4:
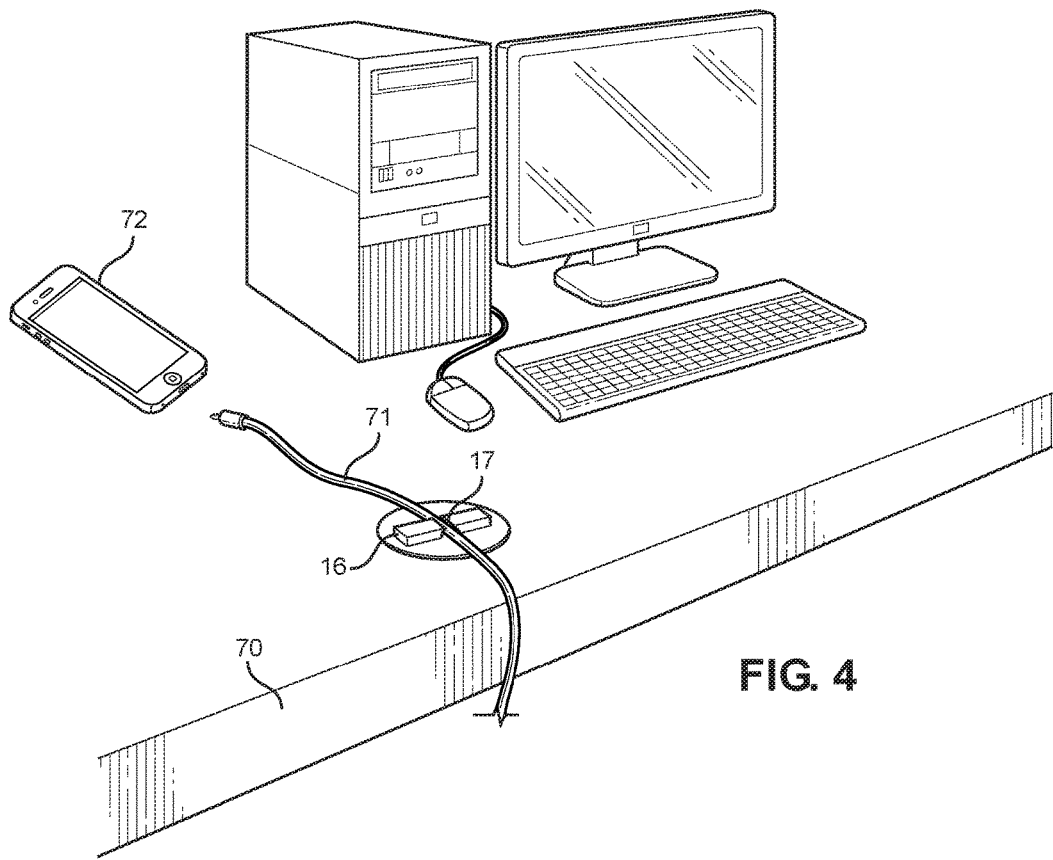
FIG. 4 shows a perspective view of an embodiment of the cord management kit in use.

Referring now to FIG. 2 and FIG. 3, there are shown perspective views of an embodiment of the base member of the cord management kit. The base member 12 includes a lower side 14 and an upper side 15. The lower side 14 of the base member 12 comprises a fastener configured to secure the base member 12 to a surface, such as a table (as shown in FIG. 4, 70). In the illustrated embodiment, the base member 12 is circularly shaped to increase the surface area in contact with the table to provide increased adhesion through the fastener. However, in other embodiments the base member 12 comprises additional geometric shapes, such as a square, a rectangle, a triangle or a hexagon. In one embodiment, the fastener comprises an adhesive material, such that the base member 12 can be removably secured to the surface. In the shown embodiment, the planar member is composed of a material, such as plastic, that allows a base member 12 to peel away from the planar member 13 while still retaining the adhesive material. In an additional embodiment, the fastener comprises a magnet, such that the base member 12 can be removably secured to any magnetic surface. In a further embodiment, the planar member 13 is composed of a magnetic material.

A clip is disposed on the upper side of the base member 12 having a pair of opposing arms 16 composed of a padded material, wherein the arms form a gap 17 therebetween configured to receive a cord 71 (as seen in FIG. 4) therethrough. The arms 16 are biased toward one another such that pressure is exerted against opposite sides of the cord received through the gap 17. In the shown embodiment, the arms 16 comprise a thickness different than the thickness of the base member 12. In the embodiment illustrated in FIG. 2, the arms 16 comprise a pair of rectangular prisms disposed on the upper side 15 of the base member 12, wherein an interior surface of each arm 16 is arcuate such that it tapers from an upper surface of the arm 16 to the upper side 15 of the base member 12. In this illustrated embodiment, the arms 16 are not flexible, but the padded material allows the cord 71 to be removably secured within the gap 17. In the shown embodiment, the gap 17 comprises a length less than that of the cord received therethrough.

Further, in the embodiment shown in FIG. 3, the arms 16 are arcuate such that the arms 16 curve inwardly toward one another so as to form an inner area 18 there beneath that includes a semi-circular cross-section. In an additional embodiment, the arms 16 are flexible, such that a plurality of cords of a plurality of thicknesses can be secured therein. In one embodiment, the planar member 13 is configured with a plurality of base members 12 of different embodiments, such that a user can choose from the plurality of base members 12 depending on which base member 12 is needed.

Referring now to FIG. 4, there is shown a perspective view of the cord management kit in use. The base member 12 is configured to removably secure to a surface 70, such as a desk or a table. In other embodiments, the base member 12 is configured to removably secure to other surfaces, such as a door or a wall. The gap 17 created by the arms 16 has received a cord 71 therethrough, such that the cord 71 is removably secured when disposed on the surface 70. The cord 71 is positioned such that it is disposed in the desired location in proximity to a mobile device 72, such as a phone or tablet.

In operation, a user removes a base member from the planar member and affixes it to a surface, such as a table or desk. The base member has a pair of arms disposed on the upper side such that a gap is formed. The gap is configured to receive a cord therethrough, thereby allowing a user to removably secure a cord disposed on a table. In this way, a user is able to secure and organize any cords that surround the table or desk.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cord management kit, comprising:
   a base member having a lower side and an upper side;
   the lower side of the base member comprising a fastener configured to removably secure the base member to a surface;
   a clip disposed on the upper side of the base member having a pair of opposing arms composed of a padded material forming a gap therebetween having a diameter less than that of a cord;
   a planar member configured to retain one or more base members thereon, such that the base members are removably affixed to the planar member;
   wherein the arms are flexible such that that the gap is configured to receive the cord therethrough.

2. The cord management kit of claim 1, wherein the arms are biased toward one another such that pressure is exerted against opposite sides of the cord received through the gap.

3. The cord management kit of claim 1, wherein an upper surface of each arm has a greater length than a corresponding lower surface of each arm.

4. The cord management kit of claim 1, wherein an interior surface of each arm is arcuate such that the interior surface tapers from an upper surface of the arm to the lower surface of the arm.

5. The cord management kit of claim 1, wherein the arms are arcuate such that the arms curve inwardly toward one another so as to form an inner area there beneath.

6. The cord management kit of claim 1, wherein the arms are flexible such that a plurality of cords of a plurality of thicknesses can be secured therein.

7. The cord management kit of claim 1, wherein the fastener comprises an adhesive material.

8. The cord management kit of claim 1, wherein the fastener comprises a magnet.

9. The cord management kit of claim 8, wherein the planar member comprises a magnetic material.

10. The cord management kit of claim 1, wherein the base member is circularly shaped.

11. The cord management kit of claim 1, wherein the base members are disposed on the planar member in a grid arrangement at regular intervals, such that base members extend the entire width and length of the planar member.

12. The cord management kit of claim 1, wherein the lower sides of the base members are composed of a peel-away backing.

13. The cord management kit of claim 1, wherein the gap comprises a length of at least two millimeters.

14. The cord management kit of claim 1, wherein the arms and base member comprise two different thicknesses.

* * * * *